(12) United States Patent
Lajoie et al.

(10) Patent No.: US 9,095,101 B2
(45) Date of Patent: Aug. 4, 2015

(54) TREE FELLING HEAD

(75) Inventors: Jacques Lajoie, Saint-Nicolas (CA); François Breton, Saint-Honoré-de-Shenley (CA)

(73) Assignee: Les Industries Forestieres Pro Pac Ltee, Saint-Come-Liniere, (Quebec) (CA)

( * ) Notice: Subject to any disclaimer, the term of this patent is extended or adjusted under 35 U.S.C. 154(b) by 1273 days.

(21) Appl. No.: 12/964,120

(22) Filed: Dec. 9, 2010

(65) Prior Publication Data

US 2011/0132495 A1    Jun. 9, 2011

Related U.S. Application Data

(60) Provisional application No. 61/267,851, filed on Dec. 9, 2009.

(51) Int. Cl.
*A01G 23/083* (2006.01)
*A01G 23/091* (2006.01)
*F16H 1/22* (2006.01)

(52) U.S. Cl.
CPC .......... *A01G 23/083* (2013.01); *A01G 23/091* (2013.01); *F16H 1/22* (2013.01); *Y10T 74/19642* (2015.01)

(58) Field of Classification Search
CPC .... A01G 23/08; A01G 23/081; A01G 23/083
USPC ....... 144/34.1, 34.2, 335; 74/409, 412 R, 413
See application file for complete search history.

(56) References Cited

U.S. PATENT DOCUMENTS

| | | |
|---|---|---|
| 2,538,371 A | 1/1951 | Le Tourneau |
| 3,343,575 A | 9/1967 | Trout |
| 5,441,090 A | 8/1995 | Hill et al. |
| 5,727,610 A | 3/1998 | Isley |
| 5,908,060 A | 6/1999 | Fargeot |
| 5,975,166 A | 11/1999 | MacLennan |
| 6,123,124 A | 9/2000 | Naud |
| 6,435,235 B1 | 8/2002 | Hicks |
| 8,141,602 B2 * | 3/2012 | Roy .............................. 144/4.1 |

* cited by examiner

*Primary Examiner* — Shelley Self
*Assistant Examiner* — Matthew G Katcoff
(74) *Attorney, Agent, or Firm* — Price Heneveld LLP

(57) ABSTRACT

A gear assembly for a tree felling head having a frame securable to a manipulator arm of a tree cutting carrier, the gear assembly includes a final gear securable to the frame and rotatably engageable over a bearing-like member mounted to the manipulator arm for pivotally mounting the frame to the manipulator arm; and a driving gear generating a torque, the torque of the driving gear being applied to at least two intermediate gears drivingly connected with the final gear.

11 Claims, 8 Drawing Sheets

TREE FELLING HEAD

CROSS-REFERENCE TO RELATED APPLICATIONS

This application claims priority under 35 USC§119(e) of U.S. provisional patent application 61/267,851 filed on Dec. 9, 2009, the specification of which is hereby incorporated by reference.

FIELD OF THE INVENTION

The technical field relates to a tree harvesting machine and, more particularly, to a felling head securable on a manipulator arm of a tree cutting carrier. It also relates to a gear assembly for a tree felling head having a frame securable to a manipulator arm of a tree cutting carrier.

DESCRIPTION OF THE PRIOR ART

Felling heads, mounted to an end of a hydraulic crane or manipulator arm of a tractor or tracked vehicle, are used to restrain, cut, and manipulate trees. Tilting felling heads are well-suited for manipulating the cut trees since they provide greater maneuverability and increase the productivity potential.

Depending on the mechanism used for side tilting, the tilting motion can be limited to about 180 degrees or can reach 360 degrees. In several embodiments, the tilting motion is obtained through a gear assembly.

However, the relatively slow rotation speed of the felling head combined with relatively important loads create significant torque when rotation is imparted. The internal and superficial stresses on the gear teeth often exceed the prescribed limits and create premature wear or gear breakage. Furthermore, the radial stresses on the mechanical components which actuate idler gears of the gear assembly are too high. To reduce stress applied on the gear assembly components, additional gear assemblies including motor and associated driving gears and idler gears are added. By adding gear trains, the forces are divided to reach the prescribed limits. However, the weight of the resulting felling head carried by the manipulator arm significantly increases.

There is thus a need for a gear assembly for a tree felling head which has internal and superficial stress within the prescribed limits, which reduces the radial stress on the mechanical components of the gear assembly, and which reduces the additional weight associated with the gear assembly.

BRIEF SUMMARY OF THE INVENTION

It is therefore an aim of the present invention to address the above mentioned issues.

According to a general aspect, there is provided a felling head securable to a manipulator arm of a tree-cutting carrier. The felling head comprises: a frame with a final gear mounted thereto; a bearing-like member mounted to the manipulator arm and engageable with the final gear for mounting the frame to the manipulator arm, the final gear being rotatable about the bearing member; a motor having a driving output; a driving gear disposed externally to the final gear and drivingly mounted to the driving output of the motor and being drivingly connected to the final gear; and at least two intermediate gears drivingly engaged with the driving gear and drivingly connected to the final gear, the final gear rotating upon rotation of the driving output of the motor.

According to another general aspect, there is provided a felling head for mounting to a manipulator arm of a tree-cutting carrier. The felling head comprises: a frame having a holder connecting the frame to the manipulator arm and a gear train including a final gear secured to the frame, a driving gear, and at least two intermediate gears, each being located on a respective side of the driving gear and operatively engaged therewith and operatively connected to the final gear, a bearing member secured to the holder and engaged with the final gear, the final gear being rotatable about the bearing-like member; and a motor operatively connected to the driving gear, the final gear being externally driven.

According to a further general aspect, there is provided a gear train for a tree felling head having a frame securable to a manipulator arm of a tree cutting carrier. The gear train comprises: a final gear securable to the frame and rotatably engageable over a bearing-like member mounted to the manipulator arm for pivotally mounting the frame to the manipulator arm; and a driving gear generating a torque, the torque of the driving gear being applied to at least two intermediate gears drivingly connected with the final gear.

According to a further general aspect, there is provided a felling head securable to a manipulator arm of a tree-cutting carrier, the felling head comprising: a frame with a final gear secured thereto; a bearing member mounted to the manipulator arm and engageable with the final gear for mounting the frame to the manipulator arm, the final gear being rotatable about the bearing-like member; a motor having a driving output; a driving gear disposed externally to the final gear and drivingly mounted to the driving output of the motor and being drivingly connected to the final gear; and at least two intermediate gears drivingly engaged with the driving gear and drivingly connected to the final gear, the final gear and the frame rotating upon rotation of the driving output of the motor.

According to another general aspect, there is provided a tree cutting carrier comprising the felling head described above.

According to still a further general aspect, there is provided a felling head for mounting to a manipulator arm of a tree-cutting carrier, the felling head comprising: a saw blade supporting frame; a holder secured to the manipulator arm and connecting the saw blade supporting frame to the manipulator arm; a gear assembly including a final gear secured to the saw blade supporting frame, a driving gear, and at least two intermediate gears, each being located on a respective side of the driving gear and operatively engaged therewith and operatively connected to the final gear, a bearing-member secured to the holder and engaged with the final gear, the final gear being rotatable about the bearing-like member; and a motor operatively connected to the driving gear, the final gear being externally driven.

According to still another general aspect, there is provided a tree cutting carrier having a manipulator arm, comprising: a felling head having a saw blade supporting frame, a holder connecting the saw blade supporting frame to the manipulator arm, a slewing bearing including a final gear secured to the saw blade supporting frame and a bearing member secured to the holder and engaged with the final gear, the final gear being rotatable about the bearing-like member, and a first gear assembly including a driving gear and at least two intermediate gears, each being located on a respective side of the driving gear and operatively engaged therewith and operatively connected to the final gear, the final gear being externally driven.

According to a further general aspect, there is provided a gear assembly for a tree felling head having a saw blade supporting frame securable to a manipulator arm of a tree cutting carrier, the gear assembly comprising: a final gear securable to the saw blade supporting frame and rotatably engageable over a bearing member mounted to the manipulator arm for pivotally mounting the saw blade supporting frame to the manipulator arm; and a driving gear generating a torque, the torque of the driving gear being applied to at least two intermediate gears drivingly connected with the final gear.

According to still another general aspect, there is provided method for rotating a tree felling head having a saw blade supporting frame securable to a manipulator arm of a tree cutting carrier. The method comprises: rotating a driving gear actuator to engage in rotation a driving gear; transmitting the rotation movement of the driving gear to at least two intermediate gears mounted on a respective side of the driving gear; and transmitting the rotation movement of the at least two intermediate gears to a final gear secured to the saw blade supporting frame, the rotation movement being transmitted externally to the final gear, the rotation movement of the final gear engages in rotation the saw blade supporting frame of the tree felling head.

BRIEF DESCRIPTION OF THE DRAWINGS

It will be noted that throughout the appended drawings, like features are identified by like reference numerals.

DETAILED DESCRIPTION

Figure 1:
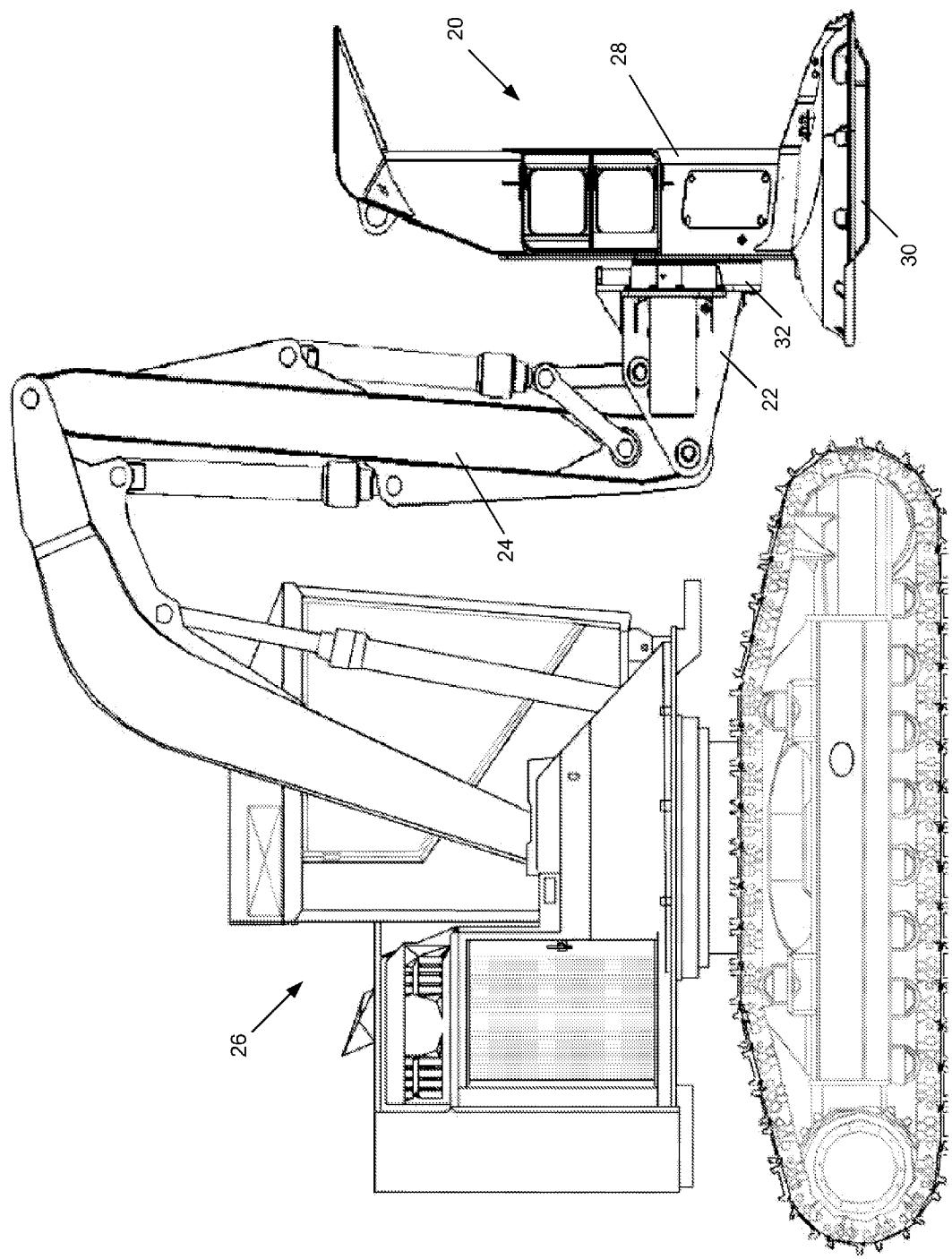
FIG. 1 is a side elevation view of a tree cutting carrier with a felling head mounted to a manipulator arm in accordance with an embodiment.
Figure 2:
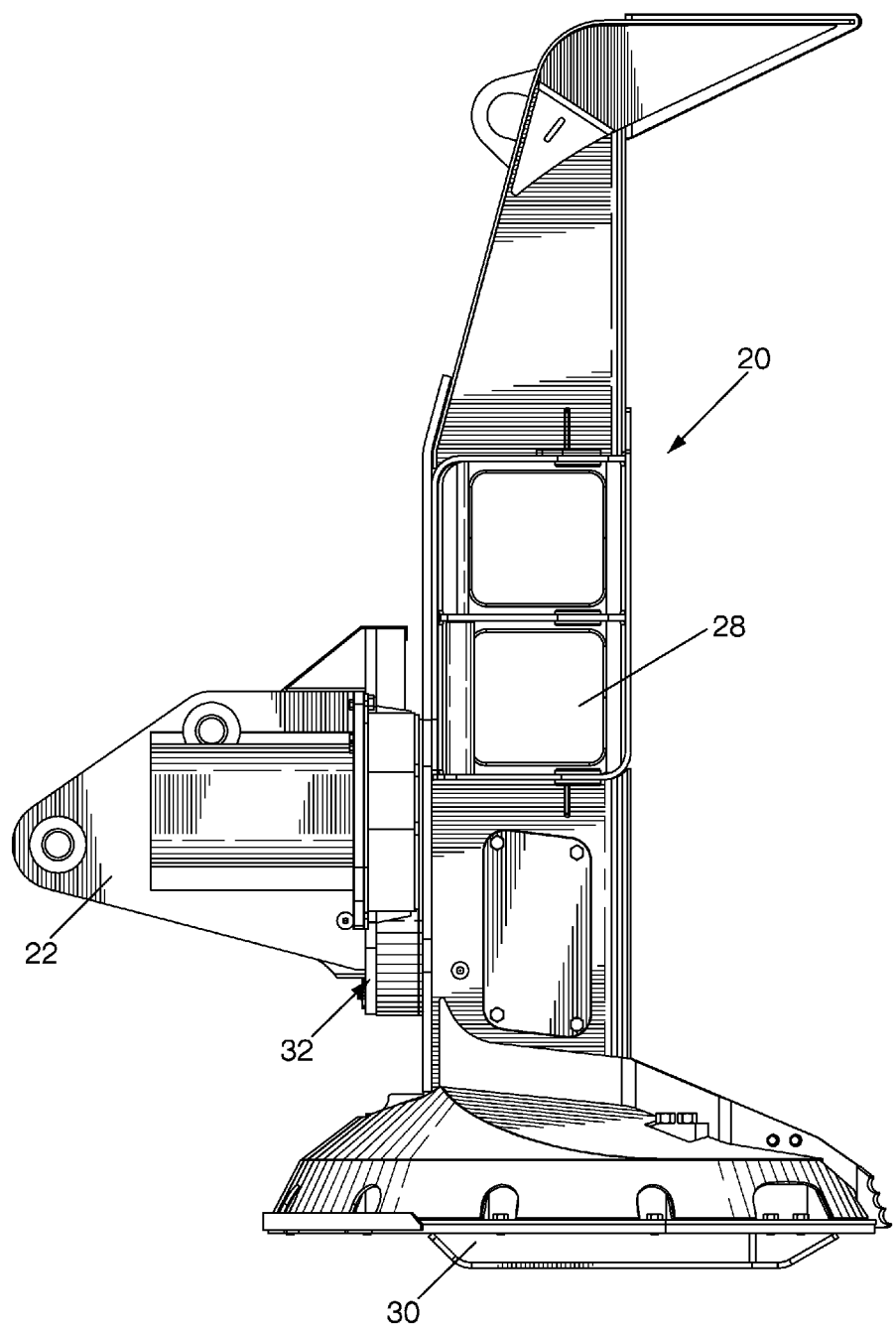
FIG. 2 is a side elevation view of the felling head shown in FIG. 1 mounted to a tilting holder in accordance with an embodiment.
Figure 3:
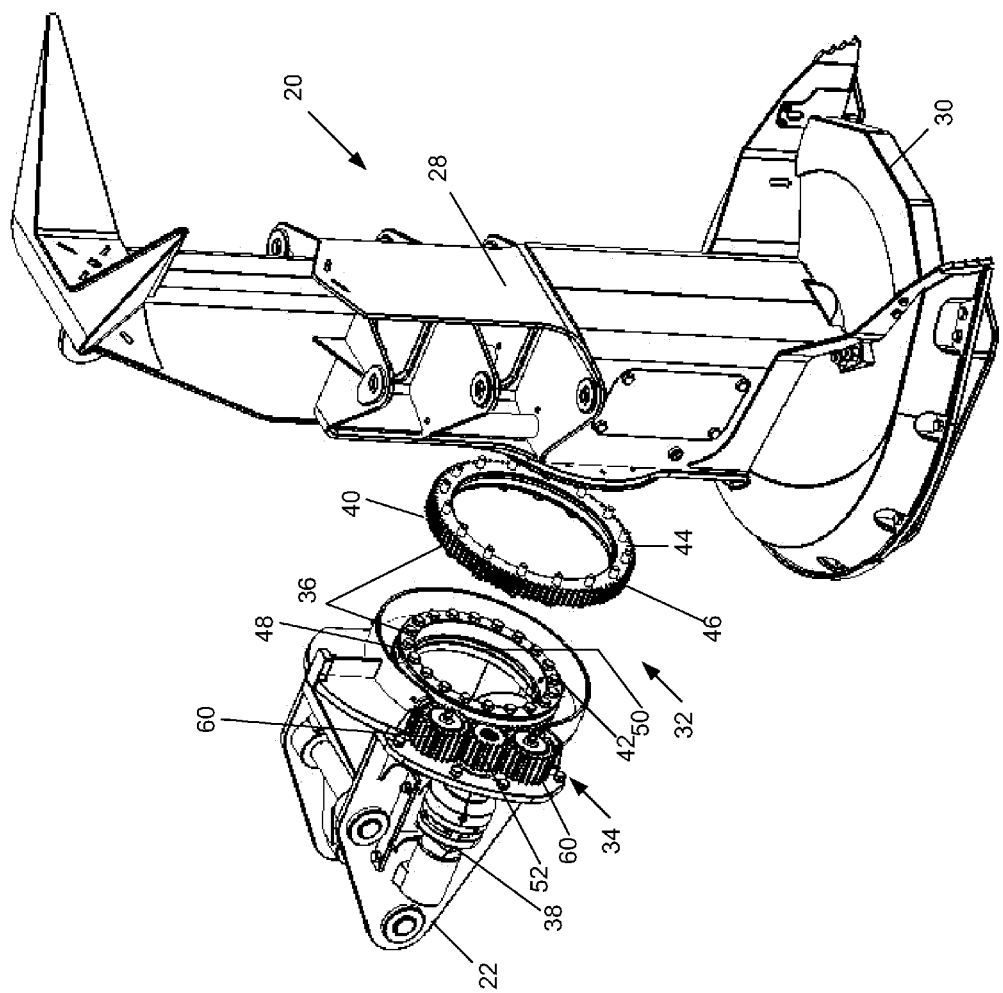
FIG. 3 is a perspective view, exploded, of the felling head, a gear assembly and the tilting holder shown in FIG. 2.
Figure 4:
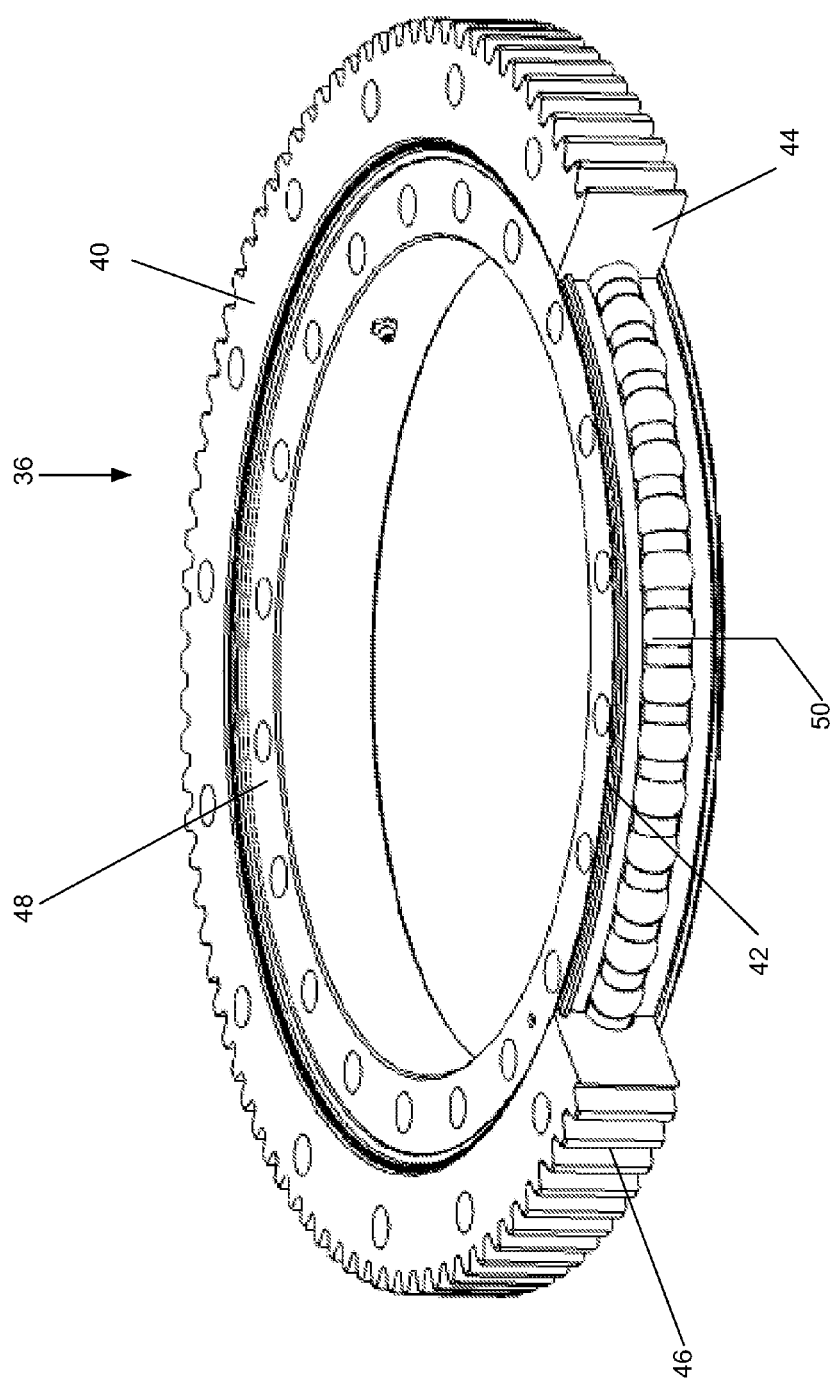
FIG. 4 is a perspective view, partly sectioned, of a slewing bearing of the gear assembly in accordance with an embodiment.

Referring to FIGS. 1 and 2, there is shown a tree felling head 20 adapted to grip, cut, and manipulate trees and designed for tilting and rotation movements.

The tree felling head 20 includes a tilting holder 22 mounted to a manipulator arm 24 of a tree cutting carrier 26, or other such vehicle. The tilting holder 22 is secured to an end of the manipulator arm 24.

The felling head 20 also includes a frame 28 on which is mounted a saw blade 30 for cutting trees. The saw blade 30 is usually located at the base of the frame 28. The frame 28 is secured to the tilting holder 22 through a gear assembly 32 including a gear train 34, a slewing bearing 36, and a motor-reducer 38, as it will be described in more details below.

Referring to FIGS. 3 to 6, there is shown that the slewing bearing 36 includes an external portion 40 mounted to the frame 28 and an internal portion 42 mounted to the tilting holder 22. The external portion 40 includes a final gear 44 (or outer ring) having external peripheral teeth 46. The internal portion 42 includes an inner ring 48 mounted to the tilting holder 22 and a bearing member 50 mounted about the inner ring 48 and concentric therewith. The final gear 44 is mounted to the bearing-member 50, outwardly thereof, and is rotatable thereabout, as it will be described in more details below. The final gear 44, the inner ring 48, and the bearing member 50 are thus concentric. The frame 28 rotates simultaneously with the final gear 44 since the latter is secured to the frame 28, i.e. the final gear 44 does not rotate relatively to the frame 28. As it will be described in more details below, the rotational movement is induced by the other components of the gear train 34.

Figure 6:
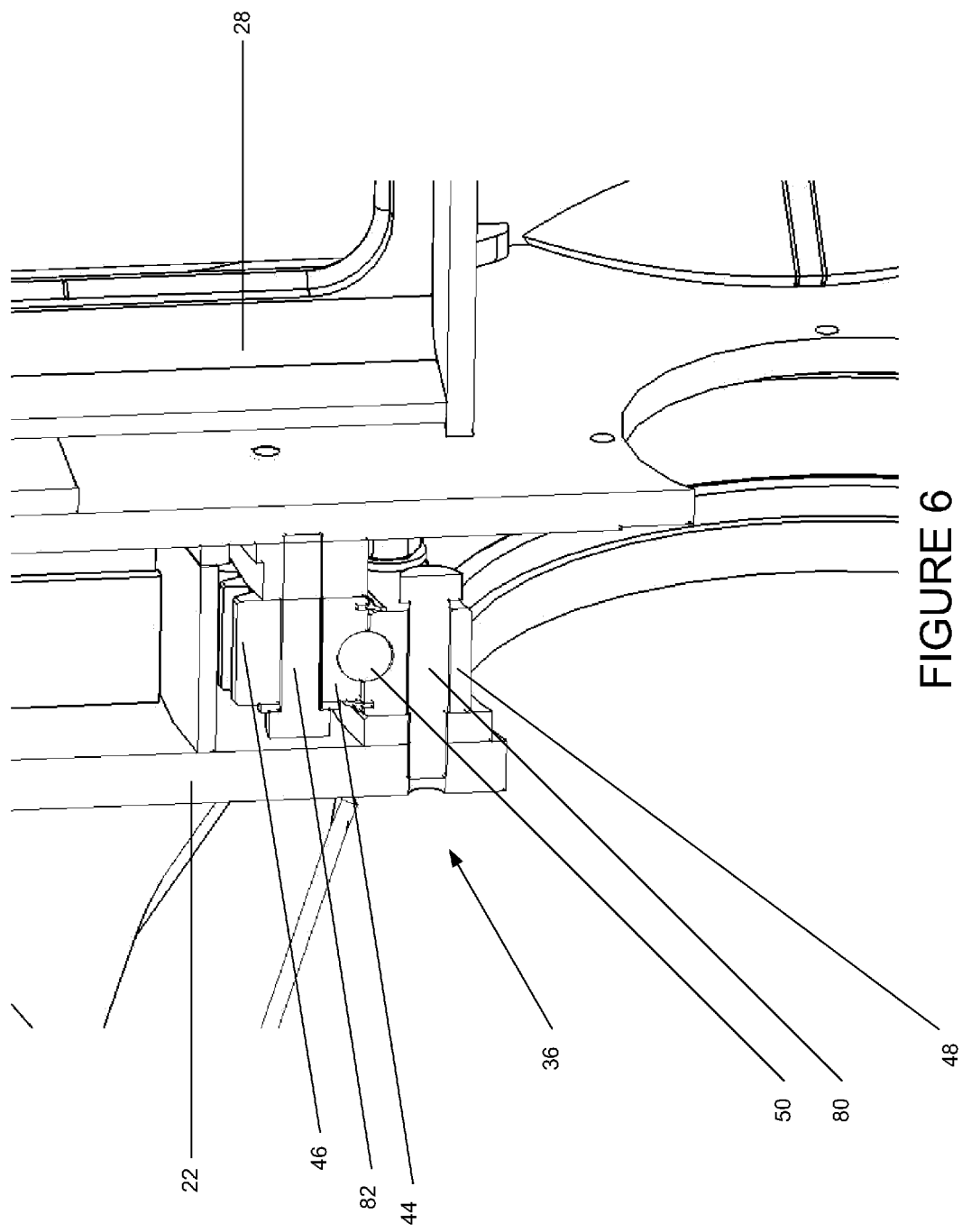
FIG. 6 is a perspective sectional view, fragmented, of the final gear attached to a frame of the felling head and an inner ring of the gear assembly attached to the tilting holder shown in FIG. 5.

As shown in FIG. 6, the inner ring 48 is secured to the tilting holder 22 through fasteners 80 inserted in both the inner ring 48 and the tilting holder 22. Similarly, the final gear 44 is secured to the frame 28 through fasteners 82 inserted in both the final gear 44 and the frame 28. One skilled in the art will appreciate that the inner ring 48 can be secured to the tilting holder 22 and the final gear 44 can be secured to the frame 28 by any other suitable method.

In the embodiment shown, the components of the slewing bearing 36 including the final gear 44, the inner ring 48, and the bearing member 50 are annular members.

Figure 5:
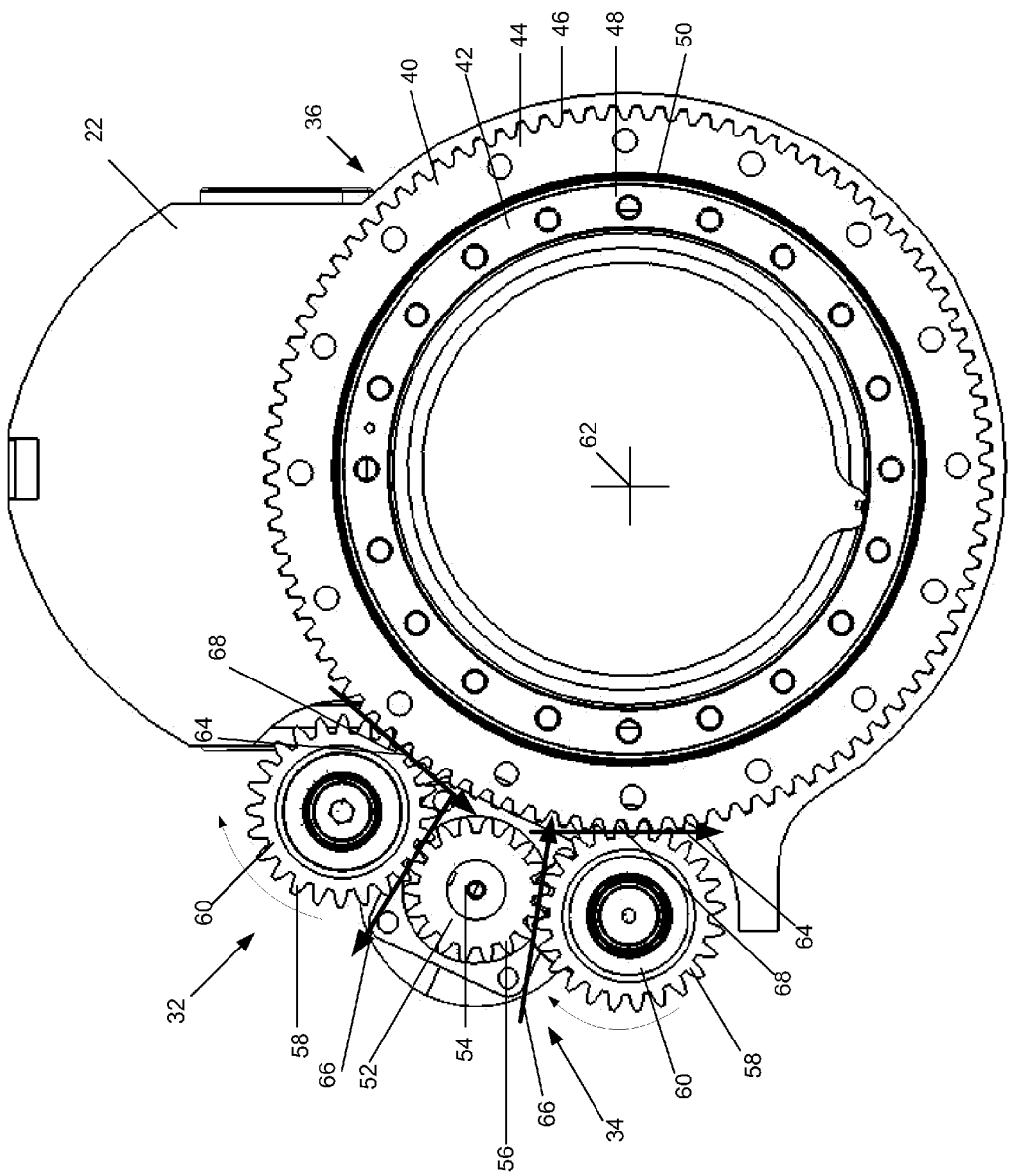
FIG. 5 is a front elevation view of a gear train for the felling head and the tilting holder shown in FIG. 2 in accordance with an embodiment, including one driving gear and two intermediate gears driving a final gear.

As shown in FIG. 5, the gear assembly 32 also includes the gear train 34. The gear train 34 includes a driving gear 52 secured to a drive shaft 54 operationally connected to the motor-reducer 38 and two intermediate (or idler) gears 60. The external and peripheral teeth 56 of the driving gear 52 are engaged with the external and peripheral teeth 58 of two intermediate gears 60, each being mounted on a respective side of the driving gear 52.

The gear train 34 including the motor-reducer 38, the drive shaft 54, the driving gear 52, and the two intermediate gears 60 is mounted to the tilting holder 22, externally to the slewing bearing 36. The external and peripheral teeth 58 of the intermediate gears 60 are engaged with the external and peripheral teeth 46 of the final gear 44. Thus, the motor-reducer 38 imparts a rotational movement to the drive shaft 54, which in turn imparts the rotational movement to the driving gear 52. The driving gear 52 engages in rotation both intermediate gears 60, which rotate the final (or driven) gear 44. Each intermediate gear 60 is mounted on a respective side of the driving gear 52 and is simultaneously engaged with the driving gear 52 and the final gear 44. The final gear 44 being secured to the frame 28, the latter rotates simultaneously with the components of the gear train 34. The final gear 44 is externally driven. The rotation axis 62 of the final gear 44 corresponds to its center and is spaced apart from the drive shaft 54 and from the rotation axis of the driving gear 52.

The torque of the driving gear 52 is transferred to both intermediate gears 60, which, in turn, transfer their torque to the final gear 44. The torque applied to the intermediate gears 60 is reduced since the torque of the driving gear 52 is applied to two intermediate gears 60.

Arrows 64 show the tangential strains applied to the final gear 44 by the intermediate gears 60. Arrows 66 in FIG. 5 show that radial strains are eliminated or significantly reduced. The intermediate gear torque is applied at two gearing points 68. Each intermediate gear 60 transfers half of the torque to the final gear 44, as shown by arrows 64. Consequently, the total strain on the intermediate gears 60 is reduced. Adding two intermediate gears 60 is advantageous for power transfer.

In the embodiment shown, the motor-reducer 38, the drive shaft 54, the driving gear 52, and the two intermediate gears 60 are mounted to the tilting holder 22. However, in alternate embodiments, these components or portions thereof can be mounted to the frame 28.

It is appreciated that the gear train 34 can be mounted either to the left or to the right side of the tilting holder 22.

Figure 7:
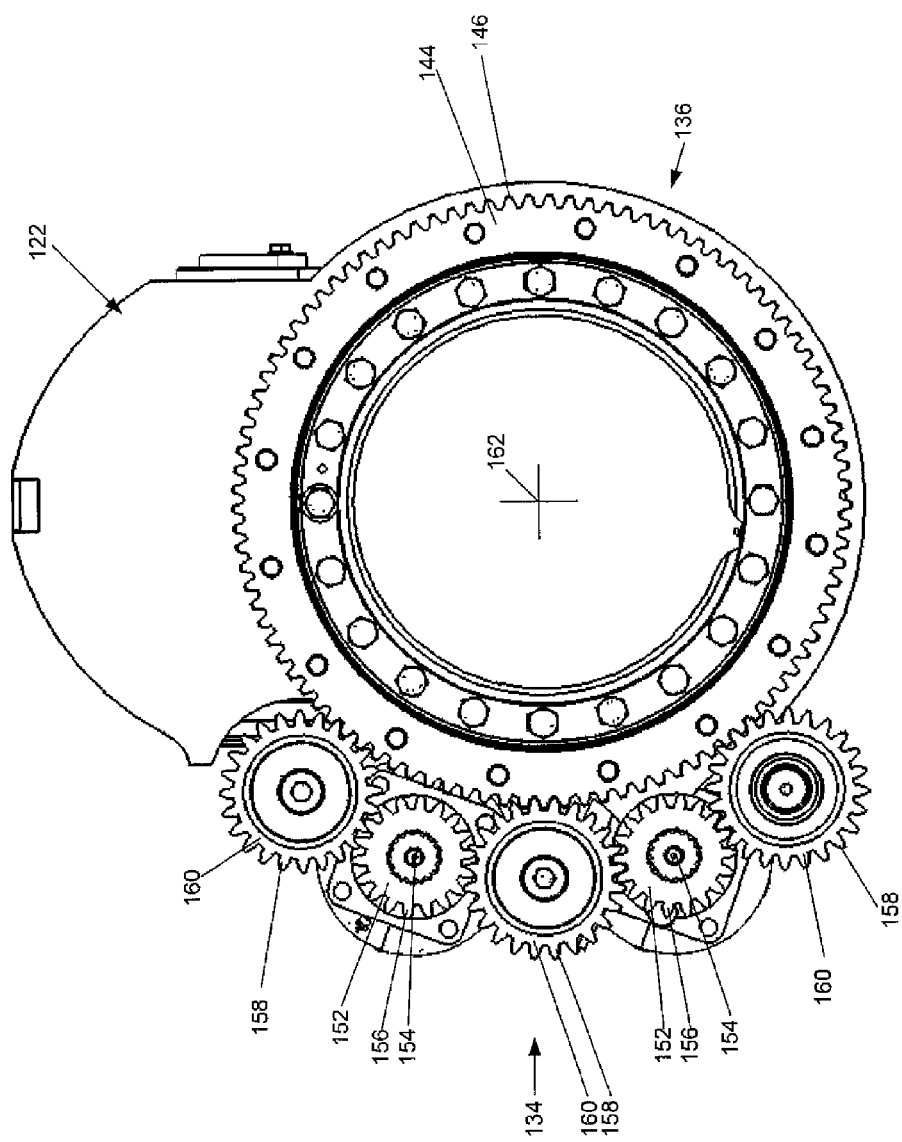
FIG. 7 is a front elevation view of a gear train for the felling head and the tilting holder shown in FIG. 2 in accordance with another embodiment, including two driving gears and three intermediate gears driving the final gear.

FIG. 7 shows an alternative embodiment of the gear assembly wherein the features are numbered with reference numerals in the 100 series which correspond to the reference numerals of the previous embodiment. The gear assembly includes two motor-reducers (not shown), two drive shafts 154, two driving gears 152, and three intermediate gears 160, all mounted to the tilting holder 122, on a same side of the slewing bearing 136, and interconnected to one another as described in further details below.

The driving gears 152 are secured to a respective drive shaft 154 operatively connected to a respective motor-reducer. The peripheral and external teeth 156 of each driving gear 152 are engaged with the peripheral and external teeth 158 of two intermediate (or idler) gears 160, each being mounted on a respective side of the respective driving gear 152. Thus, each one of the driving gears 152 is interposed between two intermediate gears 160. The peripheral and external teeth 158 of one of the intermediate gears 160 are engaged with the peripheral and external teeth 156 of both driving gears 152, i.e. one of the intermediate gears 160 is interposed between both driving gears 152.

As for the previously described embodiment, the motor-reducer (not shown), the drive shafts 154, the driving gears 152, and the three intermediate gears 160 are mounted to the tilting holder 122, externally to the slewing bearing 136. The peripheral and external teeth 158 of the intermediate gears 160 are engaged with the peripheral and external teeth 146 of the final gear 144. Thus, the motor-reducer imparts a rotational movement to the drive shafts 154, which in turn impart the rotational movement to the driving gears 152. The driving gears 152 engage in rotation the three intermediate gears 160, which rotate the final (or driven) gear 144. Each intermediate gear 160 is mounted on a respective side of their respective driving gear 152 and is simultaneously engaged with at least one of the driving gears 152 and the final gear 144. The final gear 144 being secured to the frame 28, the latter rotates simultaneously with the components of the gear train 134. As for the previously described embodiment, the final gear 144 is externally driven and its rotation axis is spaced apart from the drive shafts 154 and their respective rotation axis.

The torque of each driving gear 152 is transferred to two intermediate gears 160, which, in turn, transfer their torque to the final gear 144. The torque applied to the intermediate gears 160 is reduced since the torque of each driving gear 152 is applied to two intermediate gears 160.

Figure 8:
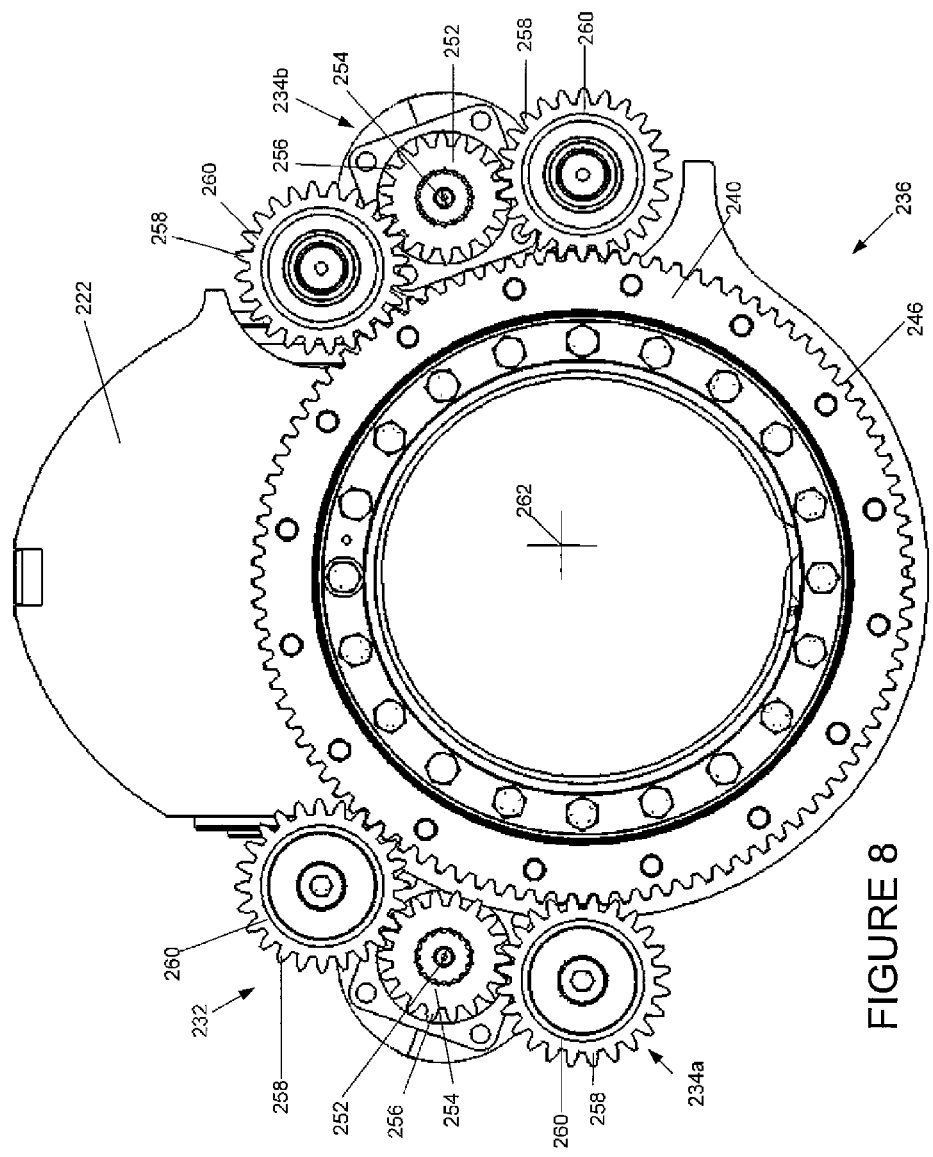
FIG. 8 is a front elevation view of two gear trains for the felling head and the tilting holder shown in FIG. 2 in accordance with another embodiment, including two driving gears, each being mounted on a respective side of the final gear and engaged with two intermediate gears.

FIG. 8 shows another alternative embodiment wherein the features are numbered with reference numerals in the 200 series which correspond to the reference numerals of the previous embodiments. The tilting holder and felling head assembly includes two gear trains 234a, 234b, each having one motor-reducer (not shown), one drive shaft 254, one driving gear 252, and two intermediate gears 260, all mounted to the tilting holder 222. Each gear train 234a, 234b is mounted on a respective side of the slewing bearing 236, with one gear train 234a mounted on a right side of the slewing bearing 236 and the other gear train 234b mounted on the left side of the slewing bearing 236.

The interconnection between the motor-reducer, the drive shaft 254, the driving gear 252, the intermediate gears 260, and the final gear 244, within one gear train 234, is similar to the one of the embodiment described above in reference to FIG. 5. The driving gears 252 are secured to their respective drive shaft 254, which in turn are operationally connected to their respective motor-reducer. The external and peripheral teeth 256 of the driving gears 252 are engaged with the external and peripheral teeth 258 of their respective intermediate gears 260, each are mounted on a respective side of their respective driving gear 252. The external and peripheral teeth 258 of the intermediate gears 260 are engaged with the external and peripheral teeth 246 of the final gear 244. Thus, the motor-reducers impart a rotational movement to their respective drive shafts 254, which in turn impart the rotational movement to the driving gears 252. The driving gears 252 engage in rotation the intermediate gears 260, which rotate the final (or driven) gear 244. The final gear 244 being secured to the frame 28, the latter rotates simultaneously with the components of the gear trains 234. The final gear 244 is externally driven. The rotation axis of the final gear 244 corresponds to its center 262 and is spaced apart from the drive shafts 254.

As for the previously described embodiments, the motor-reducers, the drive shafts 254, the driving gears 252, and the intermediate gears 260 are mounted to the tilting holder 222, externally to the slewing bearing 236.

The torque of each driving gear 252 is transferred to the intermediate gears 260, which, in turn, transfer their torque to the final gear 244. The torque applied to the intermediate gears 260 is reduced since the torque of each driving gear 252 is applied to two intermediate gears 260.

It is appreciated that any number of gear trains can be engaged with the final gear 244 for driving the latter in rotation.

In the embodiment shown in FIG. 8, the gear trains 234 are symmetrically mounted to the tilting holder 222, on a respective side of the slewing bearing 236. However, it is appreciated that, in an alternative embodiment (not shown), the gear trains 234 can be mounted in an asymmetrically manner to the tilting holder 222 and/or the frame 228 of the felling head 220.

In the illustrated embodiment, the gear trains 234 are mounted to and engaged with the superior half of the slewing bearing 236. However, one skilled in the art will appreciate that the gear trains 234 can be mounted anywhere around the slewing bearing 236.

As for the embodiments shown in FIG. 7, the torque applied to the final gear 244 for rotating the felling head 120 is higher than with the embodiment shown in FIG. 5.

In alternative embodiments, a motor can include more than one reducer section, each reducer section being operatively connected to a respective drive shaft.

It is appreciated that, in alternative embodiments (not shown), the gear assembly(ies) can include other gear components interposed between the driving gear and the intermediate gears and/or the intermediate gears and the final gear.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the spirit of the invention. The scope of the invention is therefore intended to be limited solely by the scope of the appended claims.

The invention claimed is:

1. A felling head for mounting to a manipulator arm of a tree-cutting carrier, the felling head comprising:
   a saw blade supporting frame;
   a holder secured to the manipulator arm and connecting the saw blade supporting frame to the manipulator arm;
   a gear assembly including a final gear secured to the saw blade supporting frame, a driving gear disengaged from the final gear, and at least two intermediate gears, each of the at least two intermediate gears being located on a respective side of the driving gear and operatively engaged therewith and operatively connected to the final gear, the driving gear being operatively connected to the final gear through the at least two intermediate gears, a bearing member secured to the holder and engaged with the final gear, the final gear being rotatable about the bearing-like member, and
   a motor operatively connected to the driving gear, the final gear being externally driven.

2. A felling head as claimed in claim 1, wherein the driving gear and the intermediate gears are mounted externally to the final gear and the final gear rotates in a rotation direction of a driving output of the motor when actuated.

3. A felling head as claimed in claim 1, wherein the motor, the driving gear, and the at least two intermediate gears are mounted to at least one of the holder and the manipulator arm.

4. A felling head as claimed in claim 1, wherein the at least two intermediate gears are two intermediate gears drivingly engaged with the driving gear and with driving teeth protruding outwardly from a periphery of the final gear.

5. A felling head as claimed in claim 1, wherein each one of the driving gear and the at least two intermediate gears have peripheral and external teeth and the final gear has driving teeth protruding outwardly from a periphery thereof, the peripheral and external teeth of the driving gear being engaged with the peripheral and external teeth of the at least two intermediate gears and the peripheral and external teeth of the at least two intermediate gears being engaged with the driving teeth of the final gear.

6. A felling head as claimed in claim 1, further comprising a second driving gear disposed externally to the final gear and drivingly connected to the final gear.

7. A tree cutting carrier having a manipulator arm, comprising:
   a felling head having a saw blade supporting frame, a holder connecting the saw blade supporting frame to the manipulator arm, a slewing bearing including a final gear secured to the saw blade supporting frame and a bearing member secured to the holder and engaged with the final gear, the final gear being rotatable about the bearing-member, and a first gear assembly including a driving gear and at least two intermediate gears, each one of the at least two intermediate gears being located on a respective side of the driving gear and operatively engaged therewith and operatively connected to the final gear, the driving gear being rotatable in a first rotation direction and engaging the at least two intermediate gears in rotation in a second rotation direction, opposed to the first rotation direction, the final gear being externally driven in rotation in the first rotation direction by the at least two intermediate gears and the driving gear is disengaged from the final gear.

8. A tree cutting carrier as claimed in claim 7, wherein the felling head further comprises a motor having a driving output operatively connected to the driving gear and the driving gear and the intermediate gears are mounted externally to the final gear.

9. A tree cutting carrier as claimed in claim 7, wherein the at least two intermediate gears are two intermediate gears drivingly engaged with the driving gear and the final gear.

10. A tree cutting carrier as claimed in claim 7, wherein each one of the driving gear and the at least two intermediate gears have peripheral and external teeth and the final gear has driving teeth protruding outwardly from a periphery thereof, the peripheral and external teeth of the driving gear being engaged with the peripheral and external teeth of the at least two intermediate gears and the peripheral and external teeth of the at least two intermediate gears being engaged with the driving teeth of the final gear.

11. A tree cutting carrier as claimed in claim 7, further comprising a second gear assembly including a driving gear operatively engaged with two intermediate gears, each being located on a respective side of the driving gear and operatively connected to the final gear.

* * * * *